US012642308B2

(12) United States Patent
Wensley et al.

(10) Patent No.: US 12,642,308 B2
(45) Date of Patent: Jun. 2, 2026

(54) ELECTRONIC SMOKING DEVICE WITH A HEATING ELEMENT HAVING A MODIFIED SURFACE

(71) Applicant: Fontem Ventures B.V., Amsterdam (NL)

(72) Inventors: Martin Wensley, Los Gatos, CA (US); Stefan Biel, Hamburg (DE)

(73) Assignee: Fontem Ventures B.V., Amsterdam (NL)

( * ) Notice: Subject to any disclaimer, the term of this patent is extended or adjusted under 35 U.S.C. 154(b) by 0 days.

(21) Appl. No.: 18/378,013

(22) Filed: Oct. 9, 2023

(65) Prior Publication Data

US 2024/0180258 A1 Jun. 6, 2024

Related U.S. Application Data

(63) Continuation of application No. 16/769,209, filed as application No. PCT/EP2018/083300 on Dec. 3, 2018, now Pat. No. 11,812,791.

(30) Foreign Application Priority Data

Dec. 7, 2017 (EP) .................................... 17205861

(51) Int. Cl.

| | |
|---|---|
| ***A24F 13/00*** | (2006.01) |
| ***A24F 40/44*** | (2020.01) |
| ***A24F 40/46*** | (2020.01) |
| ***A24F 40/70*** | (2020.01) |
| ***F22B 1/28*** | (2006.01) |
| ***H05B 1/02*** | (2006.01) |
| ***H05B 3/03*** | (2006.01) |

(Continued)

(52) U.S. Cl.
CPC .............. *A24F 40/70* (2020.01); *A24F 40/44* (2020.01); *A24F 40/46* (2020.01); *F22B 1/284* (2013.01); *H05B 1/0297* (2013.01); *H05B 3/03* (2013.01); *H05B 3/44* (2013.01); *A24F 40/10* (2020.01); *H05B 2203/021* (2013.01)

(58) Field of Classification Search
CPC ...................................................... A24F 47/00
USPC .................................................. 131/328–329
See application file for complete search history.

(56) References Cited

U.S. PATENT DOCUMENTS

| | | | | |
|---|---|---|---|---|
| 11,812,791 | B2 * | 11/2023 | Wensley | H05B 1/0297 |
| 2012/0144796 | A1 | 6/2012 | Marrese-Reading et al. | |

(Continued)

FOREIGN PATENT DOCUMENTS

| | | | |
|---|---|---|---|
| CN | 1126425 | A | 7/1996 |
| CN | 1320353 | A | 10/2001 |

(Continued)

OTHER PUBLICATIONS

Feng Xiao, Li Qinling "Principle and Technology of Energy Conservation in Chemical Industry", Jan. 31, 1998, pp. 122-123.

*Primary Examiner* — Phuong K Dinh
(74) *Attorney, Agent, or Firm* — Dykema Gossett PLLC

(57) ABSTRACT

It is provided an electronic smoking device (10) which comprises a liquid reservoir (34), a battery (18) and a heating element (28) adapted to atomize liquid of the liquid reservoir (34). The heating element (28) has a modified surface (50) that comprises a plurality of structures (51) adapted to provide a capillary force on liquid of the liquid reservoir (34) when applied onto the heating element (28).

20 Claims, 24 Drawing Sheets

(51) Int. Cl.
*H05B 3/44* (2006.01)
*A24F 40/10* (2020.01)

(56) References Cited

U.S. PATENT DOCUMENTS

| | | | | |
|---|---|---|---|---|
| 2015/0366265 | A1* | 12/2015 | Lansing | A24D 3/17 131/329 |
| 2016/0007652 | A1 | 1/2016 | Taluskie et al. | |
| 2016/0100633 | A1* | 4/2016 | Gao | H05B 1/0244 131/329 |
| 2017/0347714 | A1* | 12/2017 | Metz | H05B 3/48 |
| 2018/0000160 | A1* | 1/2018 | Taschner | A24F 40/46 |
| 2018/0343925 | A1 | 12/2018 | Wensley et al. | |
| 2018/0352857 | A1 | 12/2018 | Karles et al. | |
| 2019/0124979 | A1 | 5/2019 | Sebastian et al. | |

FOREIGN PATENT DOCUMENTS

| | | | |
|---|---|---|---|
| CN | 1491598 | A | 4/2004 |
| CN | 101021355 | A | 8/2007 |
| CN | 101417546 | A | 4/2009 |
| CN | 204724386 | U | 10/2015 |
| CN | 105142443 | A | 12/2015 |
| CN | 205373487 | U | 7/2016 |
| CN | 107205489 | A | 9/2017 |
| CN | 107223022 | A | 9/2017 |
| EP | 3078281 | A1 | 12/2016 |
| EP | 3248488 | A1 | 11/2017 |
| EP | 3287017 | A1 | 2/2018 |
| GB | 800773 | A | 9/1958 |
| WO | 2016169115 | A1 | 10/2016 |
| WO | 2016118005 | A1 | 7/2017 |

* cited by examiner 550b,551b

528b

510b

ELECTRONIC SMOKING DEVICE WITH A HEATING ELEMENT HAVING A MODIFIED SURFACE

CROSS-REFERENCE TO RELATED APPLICATIONS

This application is a continuation of U.S. application Ser. No. 16/769,209, filed 3 Jun. 2020 (the ’209 application), now U.S. Pat. No. 11,812,791, which is a national stage filing based upon international application no. PCT/EP2018/083300, filed 3 Dec. 2018 and published in on 13 Jun. 2019 under international publication no. WO 2019/110482 (the ’300 application). This application claims priority to European application no. 17205861.2, filed 7 Dec. 2017 (the ’861 application). The ’209 application, the ’300 application and the ’861 application are both hereby incorporated by reference as though fully set forth herein

FIELD OF INVENTION

The present invention relates generally to electronic smoking devices and in particular electronic cigarettes.

BACKGROUND OF THE INVENTION

An electronic smoking device, such as an electronic cigarette (e-cigarette), typically has a housing accommodating an electric power source (e.g. a single use or rechargeable battery, electrical plug, or other power source), and an electrically operable atomizer. The atomizer vaporizes or atomizes liquid supplied from a reservoir and provides vaporized or atomized liquid as an aerosol via a heating element. Control electronics control the activation of the heating element of the atomizer. In some electronic cigarettes, an airflow sensor is provided within the electronic smoking device, which detects a user puffing on the device (e.g., by sensing an under-pressure or an air flow pattern through the device). The airflow sensor indicates or signals the puff to the control electronics to power up the device and generate vapor. In other e-cigarettes, a switch is used to power up the e-cigarette to generate a puff of vapor.

Most heating elements used in electronic smoking devices of the state of the art consist of standard heating wires which are often wound up to a heating coil. Often, attempts to increase the heat transfer within an electronic smoking device using such heating wires or coils are directed to an increase in the wattage for the heating element. Other approaches focus on the provision of additional heating elements or wires, wherein the wires in general have a smooth surface. Sometimes, a layer of glass or ceramics is added onto this surface of the heating wire.

However, all these approaches are either cost intensive or require a plurality of additional manufacturing steps.

SUMMARY OF THE INVENTION

In accordance with one aspect of the present invention there is provided an electronic smoking device which comprises a liquid reservoir, a battery, and a heating element adapted to atomize liquid of the liquid reservoir. The heating element has a modified surface that comprises a plurality of structures adapted to provide a capillary force on liquid of the liquid reservoir when applied onto the heating element.

The characteristics, features and advantages of this invention and the manner in which they are obtained as described above, will become more apparent and be more clearly understood in connection with the following description of exemplary embodiments, which are explained with reference to the accompanying drawings.

BRIEF DESCRIPTION OF THE DRAWINGS

In the drawings, same element numbers indicate same elements in each of the views.

DESCRIPTION OF THE PREFERRED EMBODIMENTS

Figure 1:
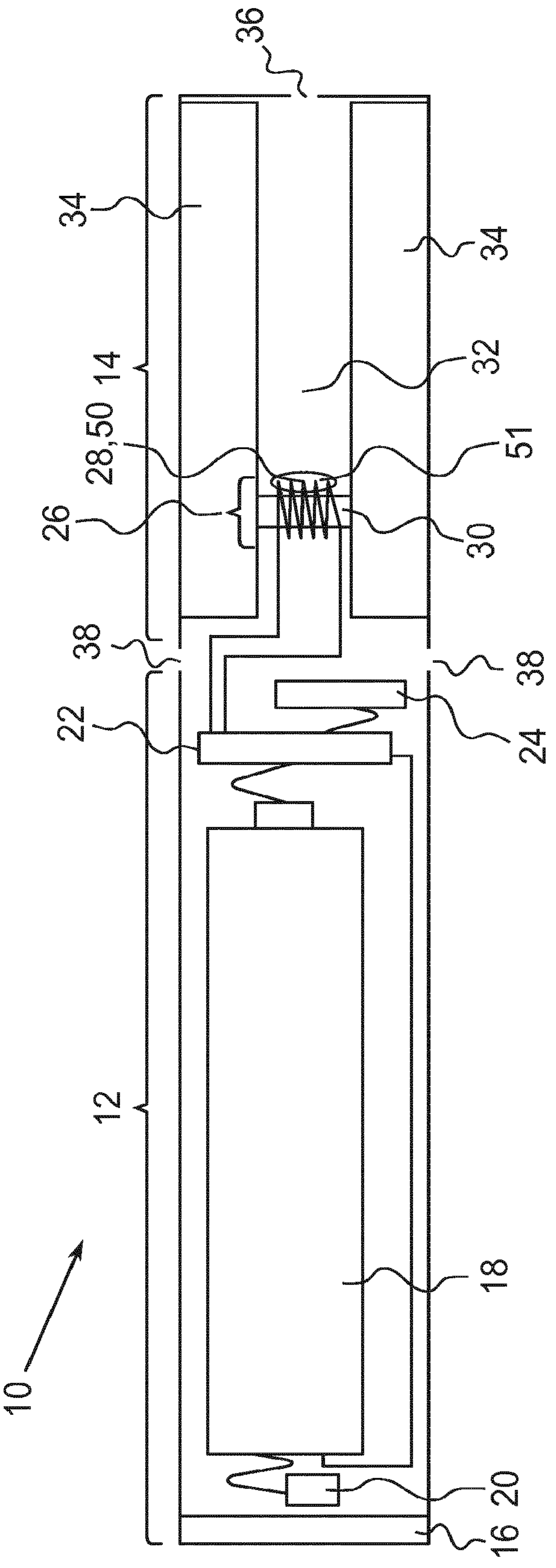
FIG. 1 is a schematic cross-sectional illustration of a first embodiment of an electronic smoking device realized as an e-cigarette.

Throughout the following, an electronic smoking device will be exemplarily described with reference to an e-cigarette. As is shown in FIG. 1, an e-cigarette 10 typically has a housing comprising a cylindrical hollow tube having an end cap 16. The cylindrical hollow tube may be a single-piece or a multiple-piece tube. In FIG. 1, the cylindrical hollow tube is shown as a two-piece structure having a power supply portion 12 and an atomizer/liquid reservoir portion 14. Together, the power supply portion 12 and the atomizer/liquid reservoir portion 14 form a cylindrical tube which can be approximately the same size and shape as a conventional cigarette, typically about 100 mm with a 7.5 mm diameter, although lengths may range from 70 to 150 or 180 mm, and diameters from 5 to 28 mm.

The power supply portion 12 and atomizer/liquid reservoir portion 14 are typically made of metal, e.g. steel or aluminum, or of hardwearing plastic and act together with the end cap 16 to provide a housing to contain the components of the e-cigarette 10. The power supply portion 12 and an atomizer/liquid reservoir portion 14 may be configured to fit together by a friction push fit, a snap fit, or a bayonet attachment, magnetic fit, or screw threads. The end cap 16 is provided at the front end of the power supply portion 12. The end cap 16 may be made from translucent plastic or other translucent material to allow a light-emitting diode (LED) 20 positioned near the end cap to emit light through the end cap. The end cap can be made of metal or other materials that do not allow light to pass.

An air inlet may be provided in the end cap, at the edge of the inlet next to the cylindrical hollow tube, anywhere along the length of the cylindrical hollow tube, or at the connection of the power supply portion 12 and the atomizer/liquid reservoir portion 14. FIG. 1 shows a pair of air inlets 38 provided at the intersection between the power supply portion 12 and the atomizer/liquid reservoir portion 14.

A power supply, preferably a battery 18, an LED 20, control electronics 22 and optionally an airflow sensor 24 are provided within the cylindrical hollow tube power supply portion 12. The battery 18 is electrically connected to the control electronics 22, which are electrically connected to the LED 20 and the airflow sensor 24. In this example the LED 20 is at the front end of the power supply portion 12, adjacent to the end cap 16 and the control electronics 22 and airflow sensor 24 are provided in the central cavity at the other end of the battery 18 adjacent the atomizer/liquid reservoir portion 14.

The airflow sensor 24 acts as a puff detector, detecting a user puffing or sucking on the atomizer/liquid reservoir portion 14 of the e-cigarette 10. The airflow sensor 24 can be any suitable sensor for detecting changes in airflow or air pressure, such as a microphone switch including a deformable membrane which is caused to move by variations in air pressure. Alternatively the sensor may be a Hall element or an electro-mechanical sensor.

The control electronics 22 are also connected to an atomizer 26. In the example shown, the atomizer 26 includes a heating element 28 which in this embodiment is realized as a heating coil that is wrapped around a wick 30 extending across a central passage 32 of the atomizer/liquid reservoir portion 14. The heating element/coil 28 may be positioned anywhere in the atomizer 26 and may be transverse or parallel to the liquid reservoir 34. The wick 30 and heating coil 28 do not completely block the central passage 32. Rather an air gap is provided on either side of the heating element 28 enabling air to flow past the heating element 28 and the 10 wick 30. The atomizer may alternatively use other forms of heating elements, such as ceramic heaters, or fiber or mesh material heaters. Nonresistance heating elements such as sonic, piezo and jet spray may also be used in the atomizer in place of the heating coil.

In this first embodiment, the heating element 28 has a modified surface 50 which comprises a plurality of structures 51 adapted to provide a capillary force on liquid of the liquid reservoir 34 when applied onto the heating element 28. An advantage of that may be that the transport of liquid provided onto the heating element 28 from the liquid reservoir 34 is significantly improved. Furthermore, such a modification increases the fraction of the surface of the heating element 28 that is exposed to liquid of the liquid reservoir 34, which allows for an increase in the amount of liquid that is vaporized within the electronic smoking device 10. The structures 51 in this embodiment exemplarily resemble circular cavities that are formed within the modified surface 50 of the heating element 28. However, also other structures 51 can be realized within the surface of the heating element 28, forming the modified surface 50 of the heating element 28. For example, the modified surface 50 can comprise a plurality of structures 51 that resemble grooves respectively. Other structures 51 may comprise line-shaped, diamond-shaped or polygon shaped cavities. In general, the structures 51 of the modified surface 50 increase the total surface of the heating element 28. Therefore, a surface of a heating element 28 without the structures 51 of the modified surface 50 would be smaller than the surface of a same sized heating element 28 comprising the modified surface 50 with the structures 51.

In this first embodiment, the structures 51 of the modified surface 50 of the heating element 28 have been generated via a mechanical treatment of the heating element 28. An advantage of that may be that such a mechanical treatment allows for the generation of a large variety of different structures 51 within or on the surface of the heating element 28. Expressed in other words, the heating element 28—which in this embodiment is realized as heating coil 28 (see above)—has been subjected to a mechanical treatment in order to generate the structures 51 forming the modified surface 50. In this embodiment, the mechanical treatment exemplarily comprised a sand-blasting treatment. Expressed in other words, the surface and therefore the structures 51 forming the modified surface 50 of the heating element 28 or the heating coil 28 have been sand-blasted. An advantage of that may be that such sand-blasted structures 51 are simple and flat structures that in total provide for a low surface roughness but nevertheless cause an increase of the contact surface between liquid from the liquid reservoir 34 and the heating element 28 which will allow a faster and increased vapor generation. Furthermore, the structures 51 forming the modified surface 50 improve the liquid transport and storage capabilities of the heating element 28 through capillary forces. Moreover, a sand-blasting treatment can easily be performed and represents an efficient procedure to modify and structure a surface.

The central passage 32 is surrounded by a cylindrical liquid reservoir 34 with the ends of the wick 30 abutting or extending into the liquid reservoir 34. The wick 30 may be a porous material such as a bundle of fiberglass fibers, with liquid in the liquid reservoir 34 drawn by capillary action from the ends of the wick 30 towards the central portion of the wick 30 encircled by the heating coil 28.

The liquid reservoir 34 may alternatively include wadding soaked in liquid which encircles the central passage 32 with the ends of the wick 30 abutting the wadding. In other embodiments the liquid reservoir 34 may comprise a toroidal cavity arranged to be filled with liquid and with the ends of the wick 30 extending into the toroidal cavity.

An air inhalation port 36 is provided at the back end of the atomizer/liquid reservoir portion 14 remote from the end cap 16. The inhalation port 36 may be formed from the cylindrical hollow tube atomizer/liquid reservoir portion 14 or maybe formed in an end cap.

In use, a user sucks on the e-cigarette 10. This causes air to be drawn into the e-cigarette 10 via one or more air inlets, such as air inlets 38, and to be drawn through the central passage 32 towards the air inhalation port 36. The change in air pressure which arises is detected by the airflow sensor 24, which generates an electrical signal that is passed to the control electronics 22. In response to the signal, the control electronics 22 activate the heating element/coil 28, which causes liquid present in the wick 30 to be vaporized creating an aerosol (which may comprise gaseous and liquid components) within the central passage 32. As the user continues to suck on the e-cigarette 10, this aerosol is drawn through the central passage 32 and inhaled by the user. At the same time the control electronics 22 also activate the LED 20 causing the LED 20 to light up which is visible via the translucent end cap 16 mimicking the appearance of a glowing ember at the end of a conventional cigarette. As the liquid present in the wick 30 is converted into an aerosol more liquid is drawn into the wick 30 from the liquid reservoir 34 by capillary action and thus is available to be converted into an aerosol through subsequent activation of the heating coil 28.

Some e-cigarettes are intended to be disposable and the electric power in the battery 18 is intended to be sufficient to vaporize the liquid contained within the liquid reservoir 34, after which the e-cigarette 10 is thrown away. In other embodiments the battery 18 is rechargeable and the liquid reservoir 34 is refillable. In the cases where the liquid reservoir 34 is a toroidal cavity, this may be achieved by refilling the liquid reservoir 34 via a refill port. In other embodiments the atomizer/liquid reservoir portion 14 of the e-cigarette 10 is detachable from the power supply portion 12 and a new atomizer/liquid reservoir portion 14 can be fitted with a new liquid reservoir 34 thereby replenishing the supply of liquid. In some cases, replacing the liquid reservoir 34 may involve replacement of the heating element/coil 28 and the wick 30 along with the replacement of the liquid reservoir 34. A replaceable unit comprising the atomizer 26 and the liquid reservoir 34 is called a cartomizer.

The new liquid reservoir 34 may be in the form of a cartridge having a central passage 32 through which a user inhales aerosol. In other embodiments, aerosol may flow around the exterior of the cartridge 32 to an air inhalation port 36.

Of course, in addition to the above description of the structure and function of a typical e-cigarette 10, variations also exist. For example, the LED 20 may be omitted. The airflow sensor 24 may be placed adjacent the end cap 16 rather than in the middle of the e-cigarette. The airflow sensor 24 may be replaced with a switch which enables a user to activate the e-cigarette manually rather than in response to the detection of a change in air flow or air pressure.

Different types of atomizers may be used. Thus for example, the atomizer may have a heating coil in a cavity in the interior of a porous body soaked in liquid. In this design aerosol is generated by evaporating the liquid within the porous body either by activation of the coil heating the porous body or alternatively by the heated air passing over or through the porous body. Alternatively, the atomizer may use a piezoelectric atomizer to create an aerosol either in combination or in the absence of a heater.

Figure 2:
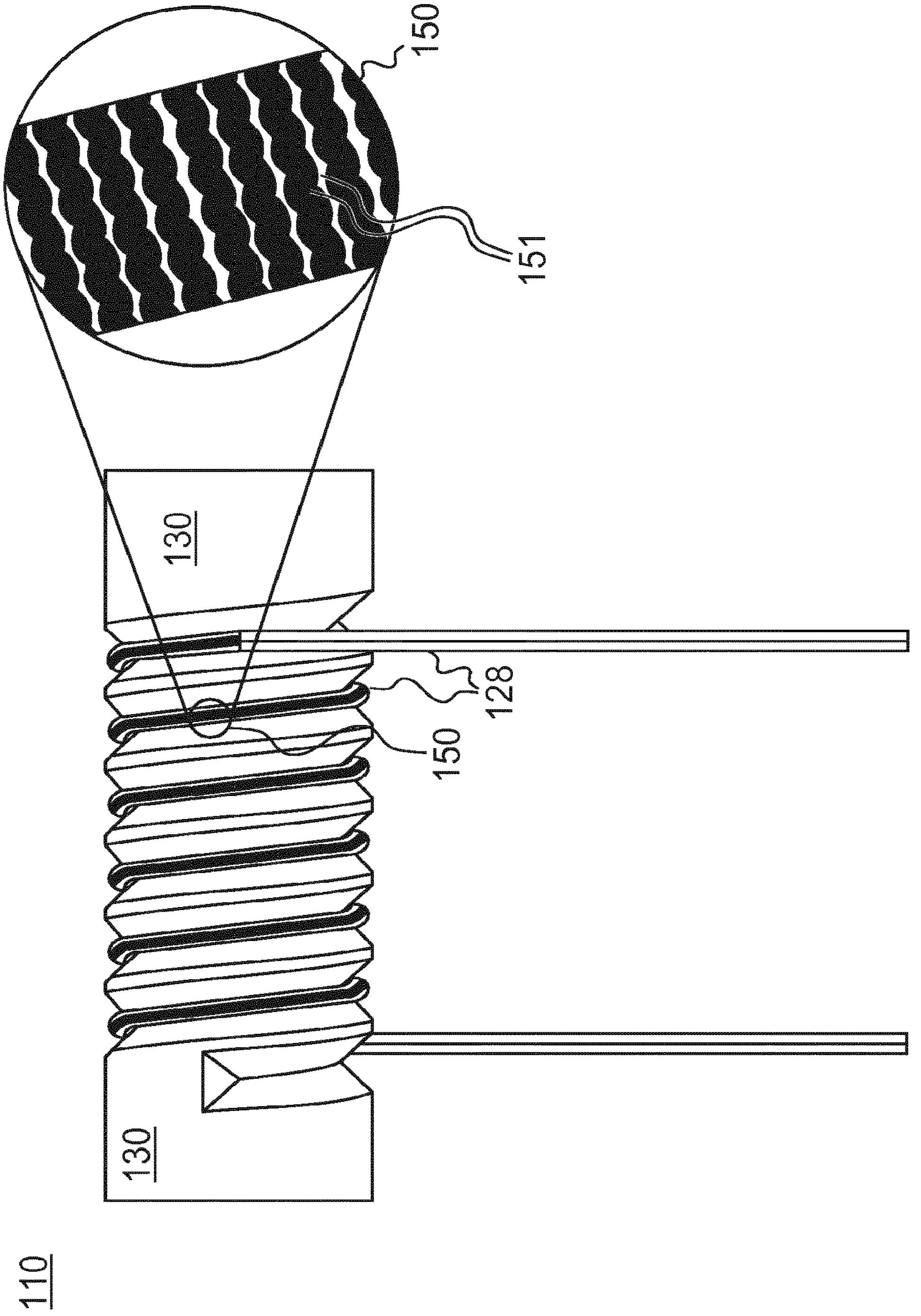
FIG. 2 is a schematic illustration of a heating element of a second embodiment of an electronic smoking device.

FIG. 2 is a schematic illustration of a heating element 128 of a second embodiment of an electronic smoking device 110. In this second embodiment, the heating element 128 is realized as a heating wire comprising a conductive material 28-1. An advantage of that may be that the heating element 128 has a thin diameter that allows a quick heating of a liquid from the liquid reservoir (not shown). In this second embodiment, the conductive material 28-1 comprises a conductive metal which in this embodiment is exemplarily realized as copper. The heating wire is wound to a heating coil 128 that is wrapped around a ceramic body that represents a wick 130. As can be seen in the detailed view shown in FIG. 2, the heating element 128 has a modified surface 150 which comprises a plurality of structures 151 that are adapted to provide a capillary force on the liquid of the liquid reservoir (not shown) when applied onto the heating element 128. An advantage of this may be that the heat that can be generated via the heating wire is further increased due to the increased surface of the heating element 128. In this second embodiment, the structures 151 of the modified surface 150 of the heating element 128 have been generated via a mechanical treatment of the heating element 128, which in this embodiment exemplarily comprised a grinding treatment. Such a grinding treatment generates a modified surface 150 with elongated wave-like shaped cavities as structures 151 which allows an efficient increase of heat that is generatable with the heating element 128. Therefore, expressed in other words, also in this second embodiment, the surface of the heating element 128 has been modified by a mechanical treatment of the heating element 128. Such a mechanical treatment can easily and cost-efficiently be performed using for example industrial tools. In this second embodiment, the mechanical treatment comprised a grinding treatment of the heating element 128. An advantage of such a grinding treatment may further be that a grinding treatment can easily be performed only using mechanical tools without needing a large quantity of material resources. In this second embodiment, not the whole surface of the heating element 128 is modified but only the portion of the heating element 128 which is coiled around the wick 130.

However, also other heating elements of embodiments of electronic smoking devices can be realized having a surface which has been modified via a different treatment. Furthermore, the treatment adapted to modify the surface of the heating element can comprise a plurality of different treatments, for example a mechanical treatment and/or a chemical treatment. In more detail, a modified surface 150 can exemplarily also be provided performing a sand-blasting treatment and/or an etching treatment.

Figure 3:
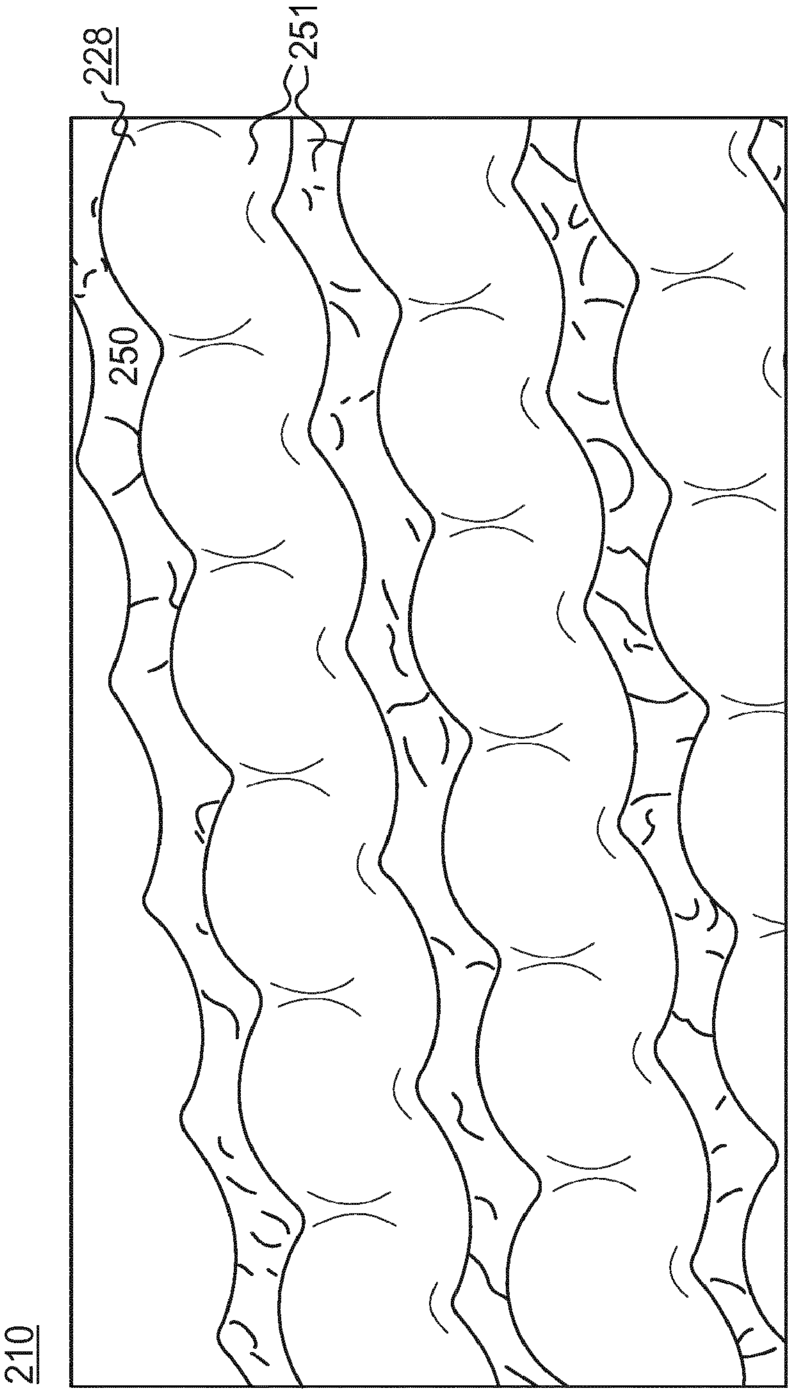
FIG. 3 is a magnified detailed view on a heating element of a third embodiment of an electronic smoking device.

FIG. 3 shows a magnified detailed view of a heating element 228 of a third embodiment of an electronic smoking device 210. In this third embodiment, the structures 251 forming the modified surface 250 of the heating element 228 have been generated via a chemical treatment of the heating element 228. An advantage of that may be that very precise and clear-cut structures 251 can be realized via a chemical treatment of the surface of the heating element 228. Furthermore, in this third embodiment, the chemical treatment exemplarily comprised an etching treatment of the heating element 228. Expressed in other words, the surface 250 of the heating element 228 has been modified by an etching treatment of the heating element 228. An advantage of such an edging treatment may be that no heat is produced when the structures 251 are etched which else may could affect the material of the heating element 228.

Furthermore, the treatment is cost-efficient and allows a quick realization of the modified surface 250. In this embodiment, clear-cut equidistant trenches are etched into the surface of the heating element 228, providing the heating element 228 with a modified surface 250 with a plurality of heat trenches that allow a precise control of heat generated via the heating element 228. In this third embodiment, the etching treatment exemplarily comprised an anisotropic etching. However, also other etching treatments can be used to produce heating elements with other modified surfaces 251 causing other advantageous effects. An etching treatment for example can comprise an isotropic etching treatment. In this third embodiment, the modified surface 250 of the heating element 228 has a maximum roughness $R_{max}$ that is greater than 0.5 mm. An advantage of that may be that the heat generation is improved without reducing the overall stability of the heating element 228.

Figure 4A:
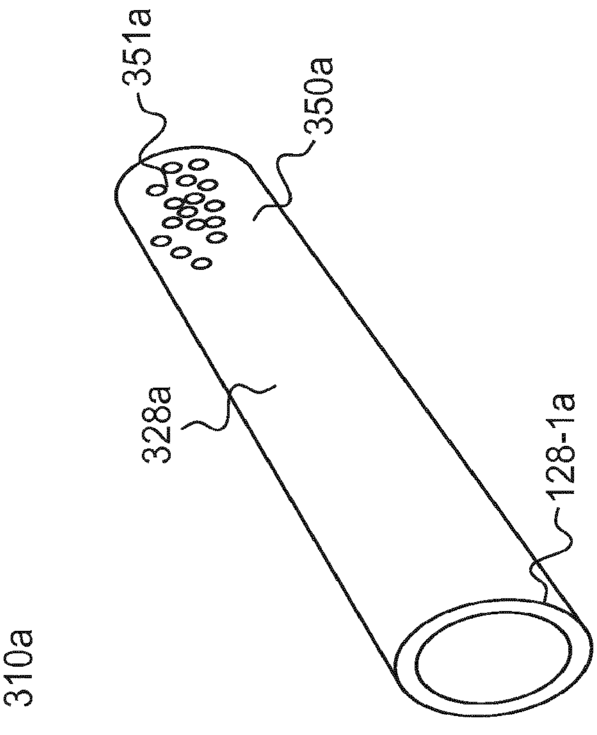
FIG. 4*a* is a schematic illustration of a tube shaped heating element of a further embodiment of an electronic smoking device.

In FIG. 4*a*, a schematic illustration of a tube shaped heating element 328*a* of a further embodiment of an electronic smoking device 310*a* is illustrated. In this further embodiment, the heating element 328*a* is realized as a heating tube that has a modified surface 350*a*. The heating tube is made of a conductive material 128-1*a*—in this embodiment exemplarily of a conductive metal—wherein the surface of the heating element 328*a* has been modified using a shot-blasting treatment, wherein the shot blasting treatment was performed using steel balls. The shot-blasting treatment provided the heating element 328*a* with a modified surface 350*a* comprising a plurality of structures 351*a* that resemble micro-cavities respectively. In FIG. 4*a*, only some of the micro-cavities are shown. Such structures 351*a* allow a quicker heating of liquid applied onto the heating element 328*a*.

Figure 4B:
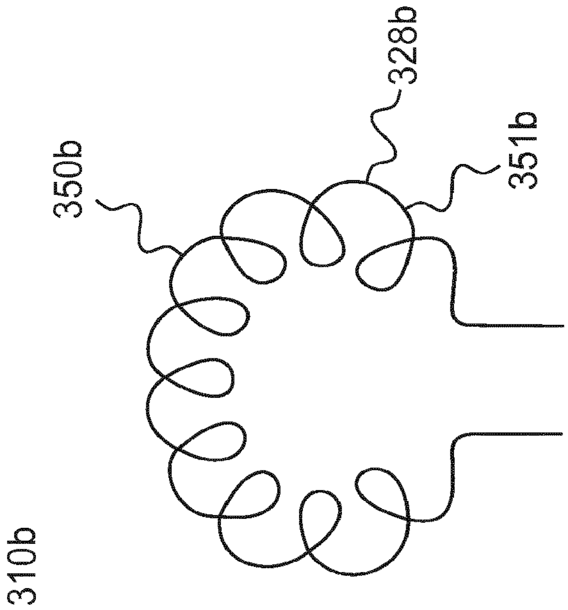
FIG. 4*b* is a schematic illustration of a toroidal shaped heating element of a further embodiment of an electronic smoking device.

FIG. 4*b* shows a schematic illustration of a toroidal shaped heating element 328*b* of a further embodiment of an electronic smoking device 310*b*. The toroidal shaped heating element 328*b* has a surface that has been modified via a laser-etching treatment of the heating element 328*b*. Expressed in other words, the surface of the heating element 328*b* shown in FIG. 4*b* has been laser-etched to provide the heating element 328*b*—or in more detail the heating wire of the heating element 328*b*—with a modified surface 350*b*. The modified surface 350*b* comprises structures 351*b* that have been generated via the laser-etching treatment of the heating element 328*b*. In more detail, the laser-etching treatment provided the heating element 328*b* with a modified surface 350*b* comprising a large plurality of thin trenches that allows a large increase in the heat that can be generated via the heating element 328*b*. Therefore, the laser etching treatment provided the surface of the heating element 328*b* with very precise structures 351*b*. The toroidal shape of the heating element 328*b* comprises a plurality of windings that are arranged in a circle.

Figure 4C:
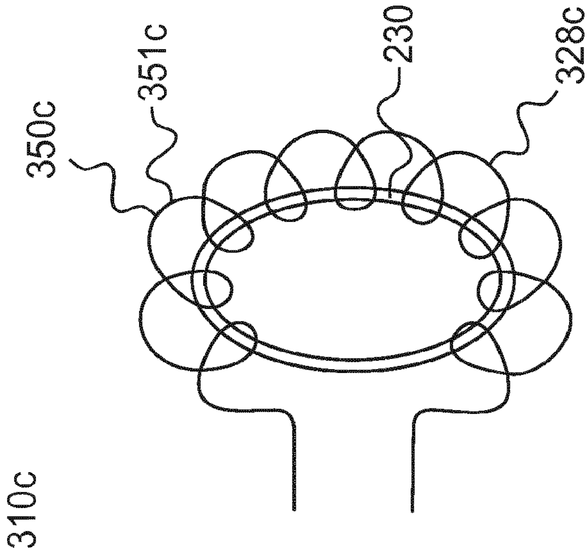
FIG. 4*c* a schematic illustration of a toroidal shaped heating element of a further embodiment of an electronic smoking device comprising a circular wick.

FIG. 4*c* shows a schematic illustration of a toroidal shaped heating element 328*c* of a further embodiment of an electronic smoking device 310*c* comprising a circular wick 230*c*. In more detail, FIG. 4*c* shows the heating element 310*b* as shown in FIG. 4*b* with a wick 230 that is lead through the windings of the toroidal shaped heating element 328*c*. The surface of the windings of the toroidal shaped heating element 328*c* has exemplarily been brushed. Such a treatment provides the surface of the heating element 310*c* with structures 351*c* that resemble grooves that advantageously increase the contact surface between the heating element 328*c* and liquid applied onto the heating element 328*c*. Brushing is a treatment that can easily be performed using for example steel brushes in order to provide a heating element with a modified surface 350*c*.

Figure 4D:
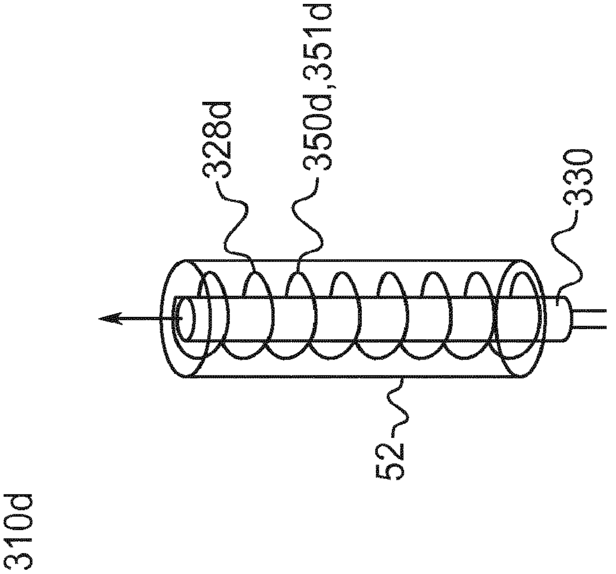
FIG. 4*d* is a schematic illustration of a coil shaped heating element of a further embodiment of an electronic smoking device.

FIG. 4*d* shows a schematic illustration of a coil shaped heating element 328*d* of a further embodiment of an electronic smoking device 310*d*. In this embodiment, the coil shaped heating element 328*d* is exemplarily wound around a rod shaped wick 330. The coil shaped heating element 328*d* together with the wick 330 is arranged within a hollow cylinder 52. In this embodiment, the surface 350*d* of the windings of the coil shaped heating element 328*d* has been polished and brushed to provide the heating element 328*d* with a modified surface 350*d* comprising two different kinds of structures 351*d* that resemble grooves within the surface of the heating element 328*d* and that differ from each other regarding their respective depth.

Figure 4E:
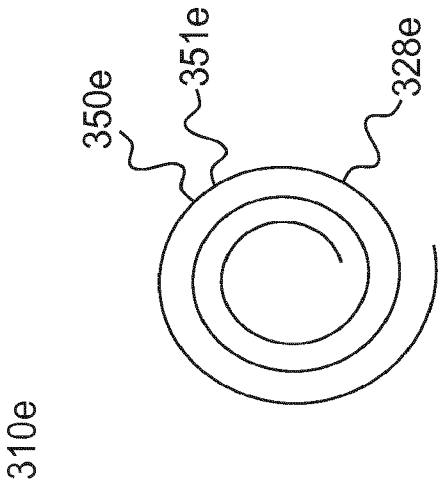
FIG. 4*e* is a schematic illustration of a flat, coil shaped heating element of a further embodiment of an electronic smoking device.
Figure 4F:
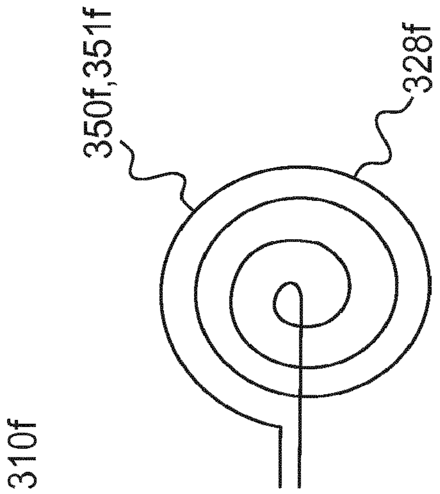
FIG. 4*f* is a schematic illustration of further flat, coil shaped heating element of a further embodiment of an electronic smoking device.

FIG. 4*e* shows a schematic illustration of a flat, coil shaped heating element 328*e* of a further embodiment of an electronic smoking device 310*e*. The flat, coil shaped heating element 328*e* comprises a heating wire that has the shape of a snail and that is arranged within a plane. The surface of the heating element 328*e* has been modified by a chemical structure etching treatment. The same applies to the surface of the further flat coil shaped heating element 328*f* as shown in FIG. 4*f* that is the heating element 328*f* of a further embodiment of an electronic smoking device 310*f*. The chemical structure etching treatment provided the surfaces of the heating elements 328*e*, 328*f* with a plurality of trapezoid shaped structures 351*e*, 351*f*. Such trapezoid shaped structures 351*e*, 351*f* allow a heat concentration on the tip points of the trapezoid structures 351*e*, 351*f*. Furthermore, the structures 351*e*, 351*f* of the modified surfaces 350*e*, 350*f* increase the total surface of the heating elements 328*e*, 328*f* respectively. An advantage of that may be that more heat can be generated via the respective heating element 328*e*, 328*f*.

Figure 4G:
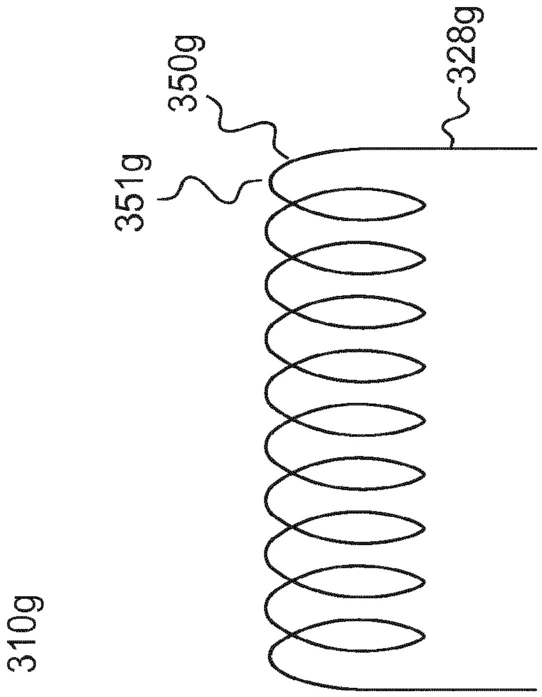
FIG. 4*g* is a schematic illustration of a solenoid shaped heating element of a further embodiment of an electronic smoking device.

FIG. 4*g* shows a schematic illustration of a solenoid shaped heating element 328*g* of a further embodiment of an electronic smoking device 310*g*. Expressed in other words, the heating element 328*g* shown in FIG. 4*g* comprises a heating wire that has the shape of an inductor. In this embodiment, the surface of the heating element 328*g* has exemplarily been mechanically treated, wherein the mechanical treatment comprised a milling of the heating wire of the heating element 328*g*. The milling flattened the heating wire of the heating element 328*g*, providing the heating element 328*g* with a modified surface 350*g* that comprises a plurality of structures 351*g* which in this embodiment exemplarily resemble spikes, each spike extending in a parallel direction. An advantage of that may be that milled heating wires—due to their reduced thickness—can be heated up to high temperatures quickly.

Figure 4H:
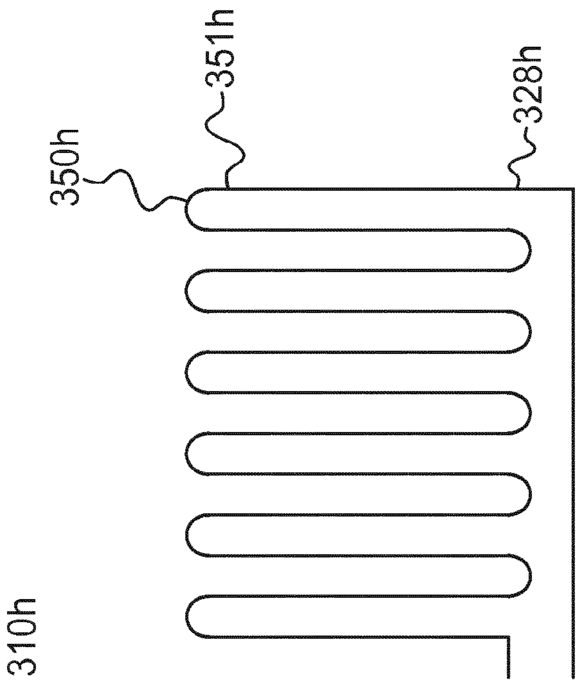
FIG. 4*h* is a schematic illustration of a meandering heating element of a further embodiment of an electronic smoking device.

FIG. 4*h* shows a schematic illustration of a meandering heating element 328*h* of a further embodiment of an electronic smoking device 310*h*. The heating element 328*h* comprises a heating wire that has a meandering shape. The surface of the heating element 310*h* in this embodiment exemplarily has been chemically treated. In this embodiment, the chemical treatment of the surface comprised pickling of the heating element 328*h*. Such a treatment provides the heating element 328*h* with a modified surface 350*h*, comprising a plurality of structures 351*h* that resemble furrows. Therefore, the heating element 328*h* is capable of providing a greater amount of heat in a shorter time period.

Figure 4I:
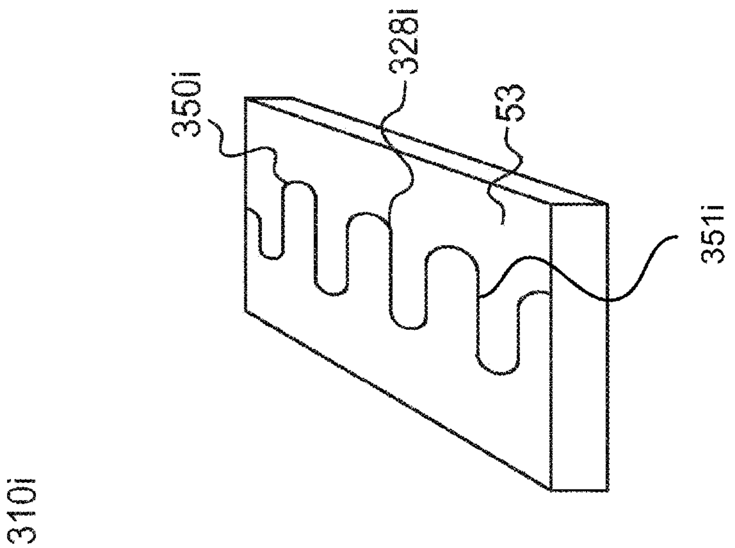
FIG. 4*i* is a schematic illustration of an integrated serpentine heating element of a further embodiment of an electronic smoking device.

FIG. 4*i* shows a schematic illustration of an integrated serpentine heating element 328*i* of a further embodiment of an electronic smoking device 310*i*. In this embodiment, the heating element 328*i* comprises a ceramic substrate 53 and a heating wire that is integrated into the ceramic substrate 53. In this embodiment, the surface of the heating wire exemplarily has been mechanically treated wherein the mechanical treatment of the heating wire comprised a scouring of the surface of the heating wire. Therefore, in this embodiment, the heating element 328*i* comprises a modified surface 350*i* that has a plurality of structures 351*i* and an average surface roughness $R_z$ of Y, wherein Y∈[5 μm; 200 μm]. However, in other embodiments and also in the embodiments described hereinbefore and hereinafter, a heating element may comprise a modified surface that has a plurality of structures and an average surface roughness $R_z$ of Y, wherein Y∈[10 μm; 200 μm], or Y∈[15 μm; 200 μm], or Y∈[20 μm; 200 μm], or Y∈[25 μm; 200 μm], or Y∈[30 μm; 200 μm] or Y∈[35 μm; 200 μm]. Experiments have shown that such heating elements 328*i* enable an optimal compromise between heat generation and overall stability of the heating element 328*i*. In this embodiment, the structures 351*i* also resemble furrows that have a small depth.

Figure 5A:
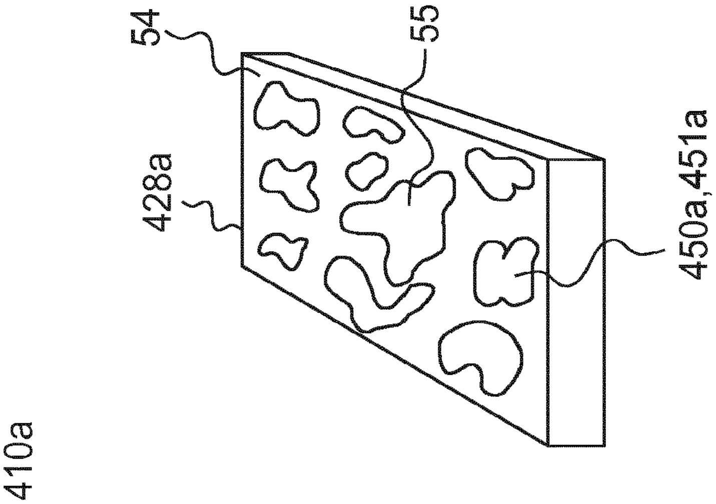
FIG. 5*a* is a schematic illustration of a flat, plane shaped heating element of a further embodiment of an electronic smoking device.

FIG. 5*a* shows a schematic illustration of a flat, plane shaped heating element 428*a* of a further embodiment of an electronic smoking device 410*a*. The heating element 428*a* comprises a substrate that is made of a non-conductive material 54. A plurality of conductive material spots 55 are integrated into the surface of the non-conductive material of the heating element 428*a*. The surface of these conductive material spots 55 has exemplarily been chemically treated wherein the chemical treatment exemplarily comprised bating and bronzing. In such an embodiment, the heating element 428*a*—in more detail, the conductive material spots 55—is provided with a modified surface 450*a* comprising a plurality of structures 451*a* which in this embodiment exemplarily resemble little gouges and notches.

Figure 5B:
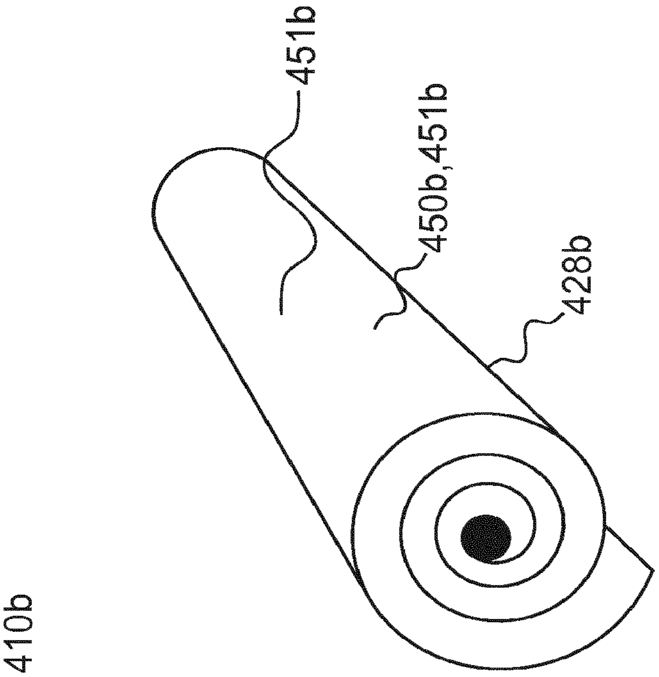
FIG. 5*b* is a schematic illustration of a layer shaped heating element of a further embodiment of an electronic smoking device.

FIG. 5*b* shows a schematic illustration of a layer shaped heating element 428*b* of a further embodiment of an electronic smoking device 410*b*. In this embodiment, the heating element 428*b* comprises a wound flexible metal layer that resembles a rolled foil. In this embodiment, the metal layer comprises a modified surface 450*b* which comprises a plurality of structures 451*b* adapted to provide a capillary force on the liquid of the liquid reservoir (not shown) when applied onto the heating element 428*b*. In this embodiment, the structures 451*b* of the modified surface 450*b* of the heating element 428*b* have exemplarily been generated via a chemical treatment of the heating element 428*b*. The chemical treatment comprised an isotropic etching treatment which provides the heating element 428*b* in the area of the modified surface 450*b* with a plurality of clear cut cubic structures 451*b*. An advantage of that may be that the heat radiation of the heating element 428*b* is particularly improved which is due to the cubic structures 451*b*.

Figure 5C:
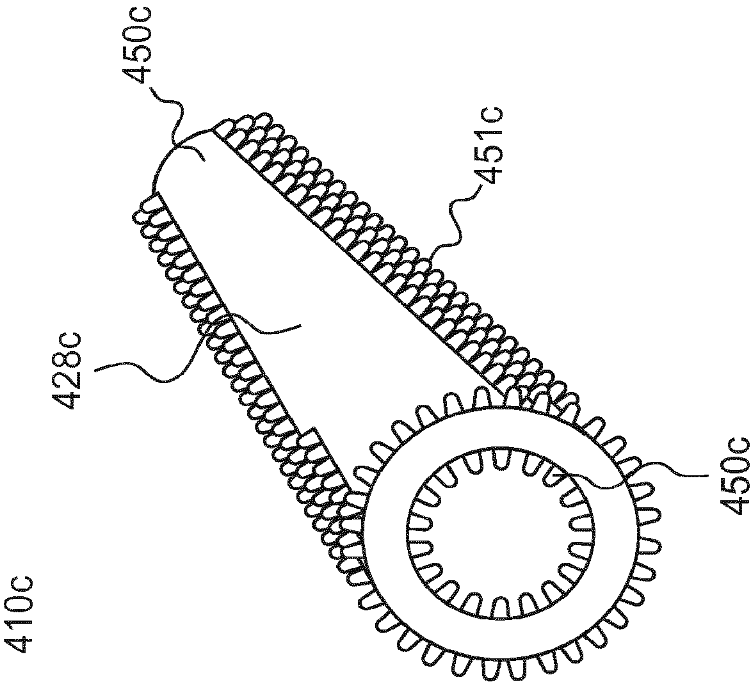
FIG. 5*c* is a schematic illustration of a tube shaped heating element of a further embodiment of an electronic smoking device.

FIG. 5*c* shows a schematic illustration of a tube shaped heating element 428*c* of a further embodiment of an electronic smoking device 410*c*. Also in FIG. 5*c*, the outer and inner surface of the tube shaped heating element 410*c* has been etched to provide these surfaces with a plurality of structures 451*c*. In FIG. 5*c*, the etched structures 451*c* are larger than the structures of the embodiments shown before, which is why they are visible as burlings in FIG. 5*c*. However, also these burlings can be further structured in other embodiments. Since in this embodiment, also the inner surface of the tube is a modified surface 450*c* and comprises a plurality of etched burlings, the surface of the heating element 428*c* is further increased.

Figure 5D:
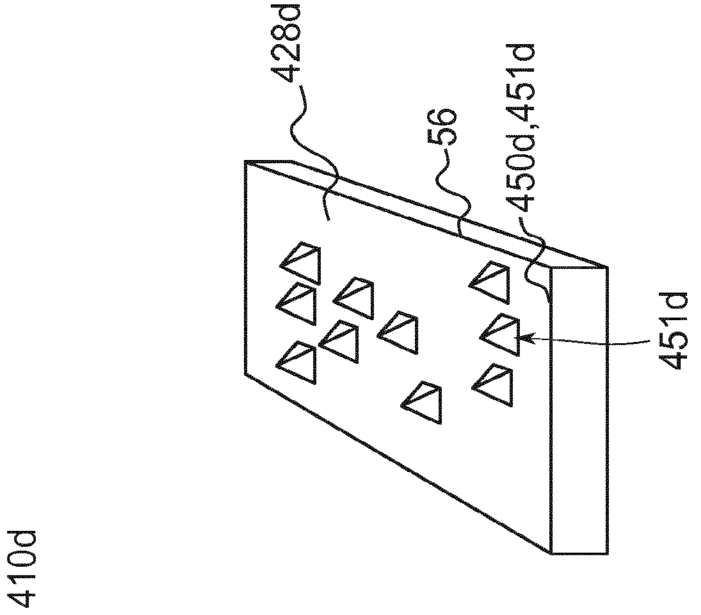
FIG. 5*d* is a schematic illustration of a further flat, plane shaped heating element of a further embodiment of an electronic smoking device.

FIG. 5*d* shows a schematic illustration of a further flat, plane shaped heating element 428*d* of a further embodiment of an electronic smoking device 410*d*. In this further embodiment, the heating element 428*d* comprises a metallic layer which is arranged on a carrier substrate 56. In this embodiment, an energy source has been used to modify the surface of the metallic layer, providing the metallic layer of the heating element 428*d* with a modified surface 450*d* comprising a plurality of structures 451*d* that have a pyramid shape. Such structures 451*d* allow an increase in heat generation, wherein the heat generation concentrates on the tip points of the pyramids. In this embodiment, the energy source exemplarily provided a laser for a laser treatment of the surface which allowed the generation of complex but precise structures 451*d*. In FIG. 5*d*, only a few of the pyramid shaped structures 451*d* are shown for the sake of a better understanding.

Figure 5E:
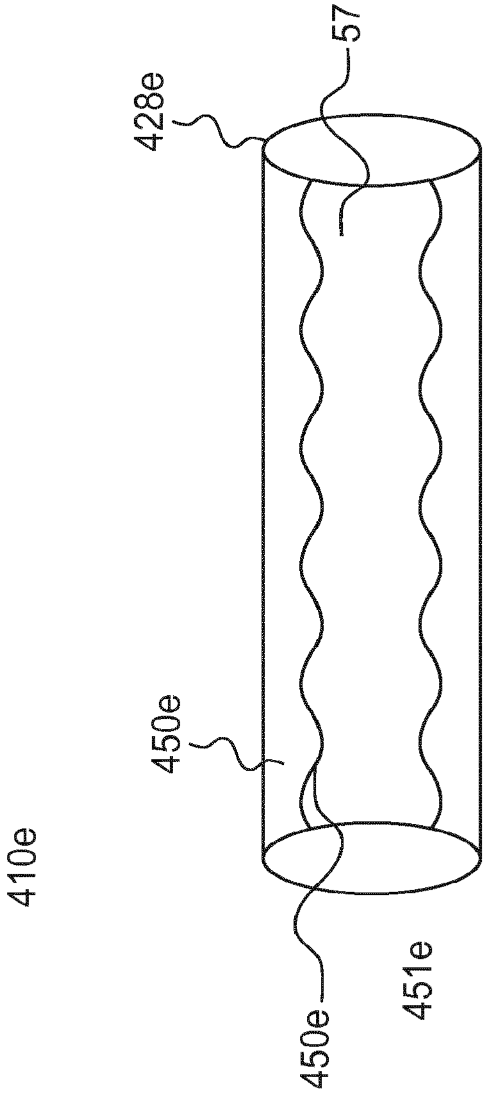
FIG. 5*e* is a schematic illustration of a further tube shaped heating element of a further embodiment of an electronic smoking device.

FIG. 5*e* shows a schematic illustration of a further tube shaped heating element 428*e* of a further embodiment of an electronic smoking device 410*e*. In this embodiment, the heating element 428*e* comprises an inner channel 57 that has a varying diameter, wherein the diameter alternates between a larger and a smaller diameter. In this embodiment, the inner surface of the inner channel 57 as well as the outer surface of the tube shaped heating element 428*e* has been shot-blasted with steel balls providing the heating element 428*e* with a modified surface 450*e* comprising a plurality of structures 451*e* that in this embodiment exemplarily resemble cracks and dimples. Such an inhomogeneous modified surface 450*e* creates an abnormal heat profile which allows an alternative vaping sensation.

Figure 5F:
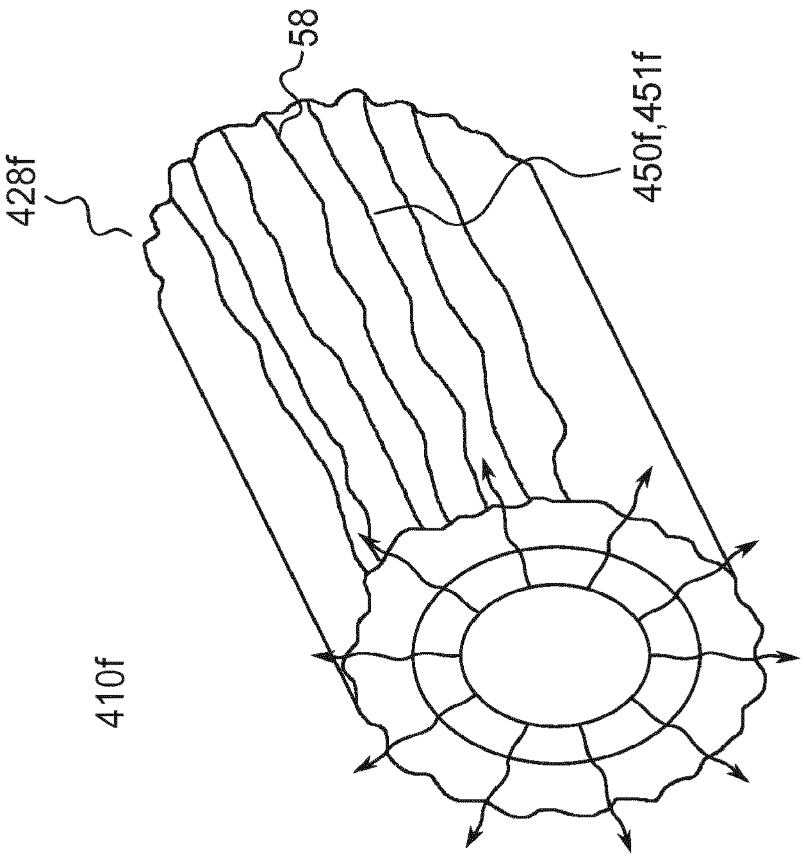
FIG. 5*f* is a schematic illustration of a multilayer tube shaped heating element of a further embodiment of an electronic smoking device.

FIG. 5*f* shows a schematic illustration of a multilayer tube shaped heating element 428*f* of a further embodiment of an electronic smoking device 410*f*. In this embodiment, the heating element 428*f* comprises a tube shaped corpus 58 that is made of a non-conductive material. A further tube which is made of a metallic, conductive material is positioned around the corpus. The metallic material of the heating element 428*f* is brushed so that elongated structures 451*f* that resemble cavities are arranged within the surface of the heating element 428*f*, providing the heating element 428*f* with a modified surface 450*f* that has a plurality of structures 451*f* which extend from a first end of the tube to a second end of the tube. These cavity-shaped structures 451*f* ameliorate the radial heat radiation profile of the heating element 428*f*.

Figure 5G:
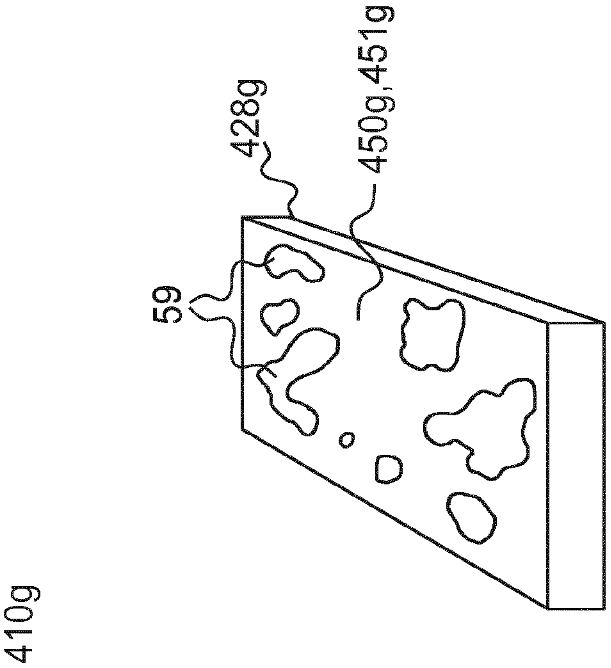
FIG. 5*g* is a schematic illustration of a further plane shaped heating element of a further embodiment of an electronic smoking device.

FIG. 5*g* shows a schematic illustration of a further plane shaped heating element 428*g* of a further embodiment of an electronic smoking device 410*g*. The plane shaped heating element 428*g* in this embodiment is exemplarily made of a conductive material and comprises a plurality of non-conductive material spots 59 arranged within the conductive material. The conductive material between the non-conductive material spots 59 in this embodiment is exemplarily chemically etched to provide the heating element 428g with a modified surface 450g that has a plurality of structures 451g that resemble micro heating fins. An advantage of such a heating element 428g may be that heat is only radiated to certain, predefined areas of the electronic smoking device 410g wherein other areas which are close to the non-conductive material spots 59 are not heated or heated to a by lower extend.

Figure 5H:
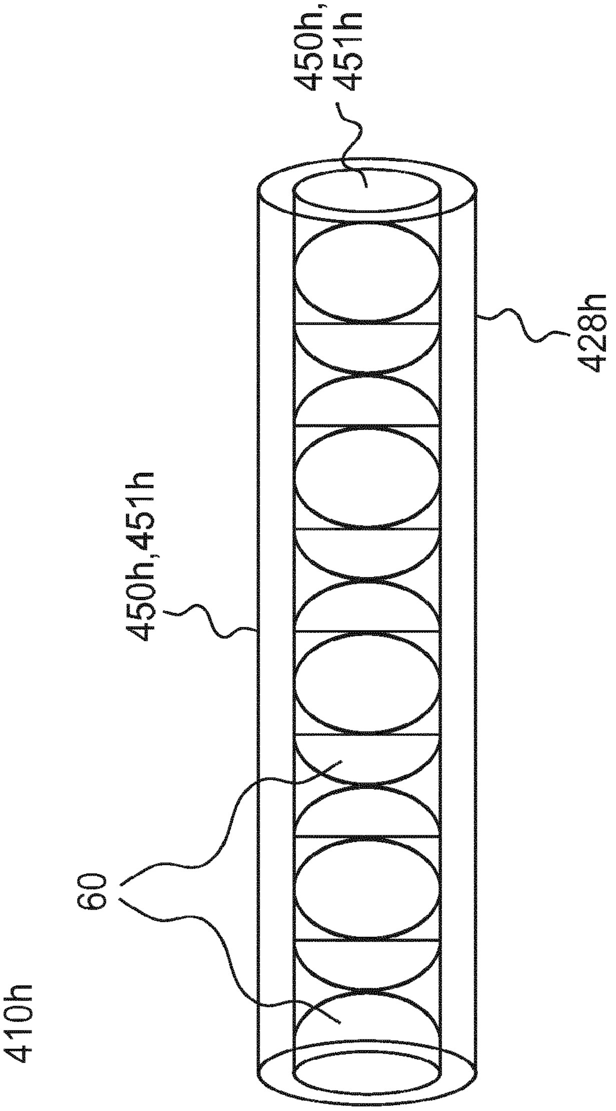
FIG. 5*h* is a schematic illustration of a further tube shaped heating element of a further embodiment of an electronic smoking device.
Figure 5I:
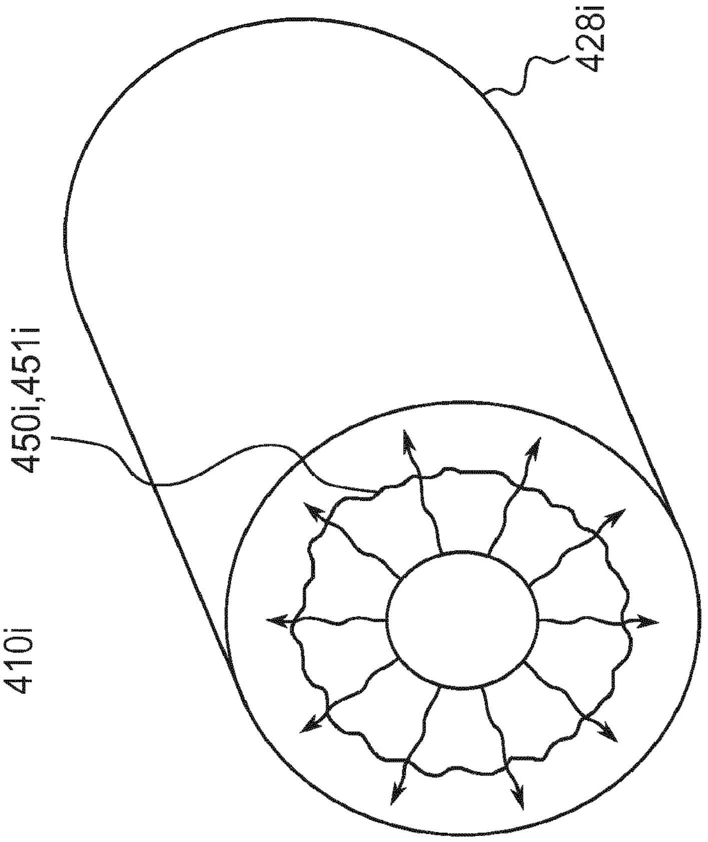
FIG. 5*i* is a schematic illustration of a further tube shaped heating element of a further embodiment of an electronic smoking device.

FIG. 5h shows a schematic illustration of a further, metallic tube shaped heating element 428h of a further embodiment of an electronic smoking device 410h. In this embodiment, the heating element 428h comprises an inner channel that is divided into separate inner chambers 60. The chambers 60 are hemispherical, causing the inner channel to open and close alternatingly along the length of the channel. The outer and inner surface of the heating element 428h in this embodiment has been etched to provide the heating element 428h with a modified surface 450h, having a plurality of structures 451h resembling heating fins. Furthermore, also the heating element 428i shown in FIG. 5i represents a tube shaped heating element 428i. In contrary to the heating element 428f shown in FIG. 5f, the heating element 428i comprises an inner conductive, in this embodiment exemplarily metallic tube that has a surface that has been brushed in order to provide the heating element 428i with a modified surface 450i having a plurality of structures 451i resembling elongated grooves.

Figure 6A:
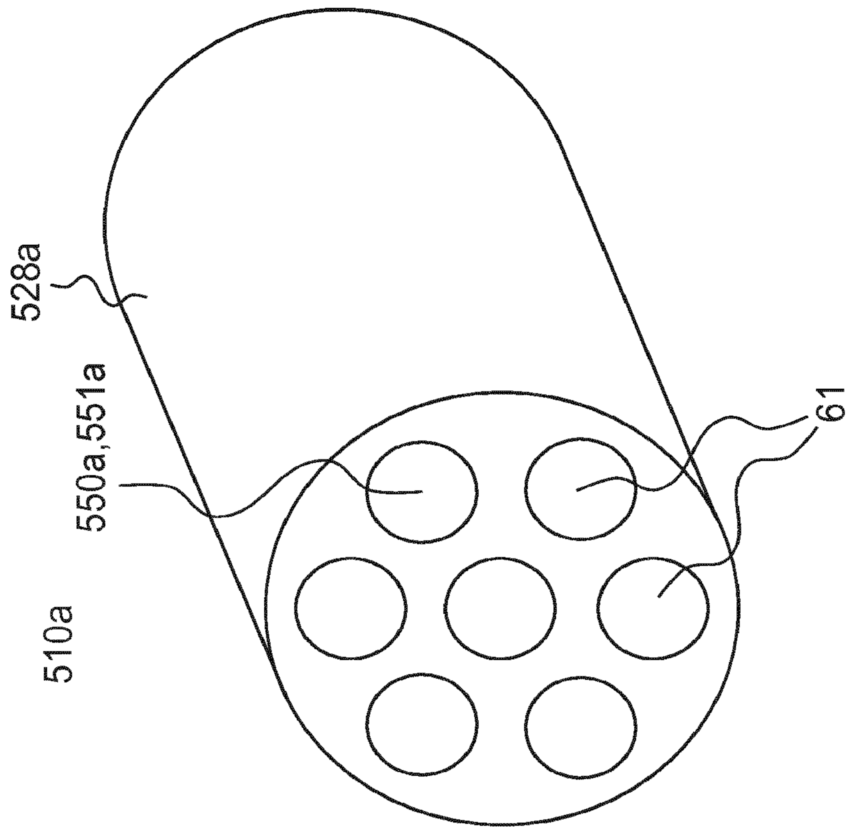
FIG. 6*a* is a schematic illustration of a further tube shaped heating element of a further embodiment of an electronic smoking device.

FIG. 6a shows a schematic illustration of a further tube shaped heating element 528a of a further embodiment of an electronic smoking device 510a. In this embodiment, the heating element 528a comprises a plurality of conductive, solid cylinders 61 which are embedded in a non-conductive, tube shaped body. The outer surfaces of the conductive solid cylinders 61 which are not covered by the material of the non-conductive, tube shaped body are structured via an etching treatment, providing the heating element 528a with a modified surface 550a comprising a plurality of structures 551a which increase the total (outer) surface of the conductive solid cylinders 61 and therefore of the heating element 528a. In this embodiment, the structures 551a exemplarily have a cuboid shape.

Figure 6B:
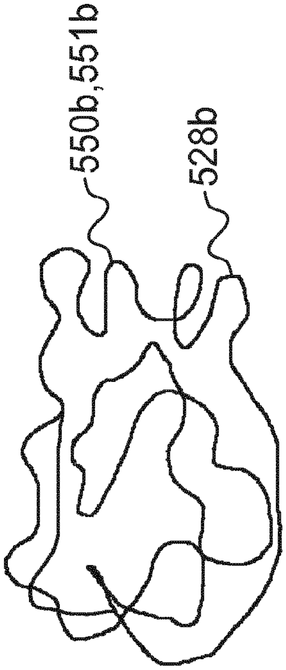
FIG. 6*b* is a schematic illustration of a knawel shaped heating element of a further embodiment of an electronic smoking device.

FIG. 6b shows a schematic illustration of a knawel shaped heating element 528b of a further embodiment of an electronic smoking device 510b. In this embodiment, the heating element 528b resembles a knawel of steel wool. Expressed in other words, in this embodiment, the heating element 528b comprises a plurality of conductive heating wires which are wound up to a knawel. In this embodiment, the heating wires have exemplarily been exposed to a mechanical milling treatment which provided the heating element 528b or in more detail the heating wires of the knawel with a modified surface 550b respectively. The modified surfaces 550b each comprise a plurality of structures 551b which resemble thorns respectively and improve the heat radiation of the heating element 528b.

Hereinbefore, different embodiments of electronic smoking devices with different heating elements have been described. All of these heating elements have been treated either mechanically, chemically or using an energy (laser) source in order to provide the respective heating element with a modified surface comprising predefined structures. However, it shall be pointed out that every kind of treatment disclosed in relation to a specific heating element can also be used to treat all the other heating elements disclosed hereinbefore, providing the respectively treated heating element with a modified surface that has the respective aforementioned specific structures.

Furthermore, also other embodiments of electronic smoking devices with other heating elements can be realized for which different treatments providing for different modified surfaces with different structures came to use. Moreover, the surface of a heating element can also be treated using a combination of the treatments disclosed hereinbefore and/or of other treatments which have not been disclosed hereinbefore.

Furthermore, many of the embodiments described hereinbefore have heating elements which comprise a modified surface that is equal to the entire surface of the respective heating element. Expressed in other words, in some of the embodiments disclosed hereinbefore, the entire surface of the heating element is modified. However, it is also possible to realize embodiments of electronic smoking devices with heating elements that have a surface of which only 5% is modified. In other embodiments, only 10%, 15%, 20%, 25%, 30%, 35%, 40%, 45%, 50%, 55%, 60%, 65%, 70%, 75%, 80%, 85%, 90% or 95% of the surface of a respective heating element is modified.

Figure 7:
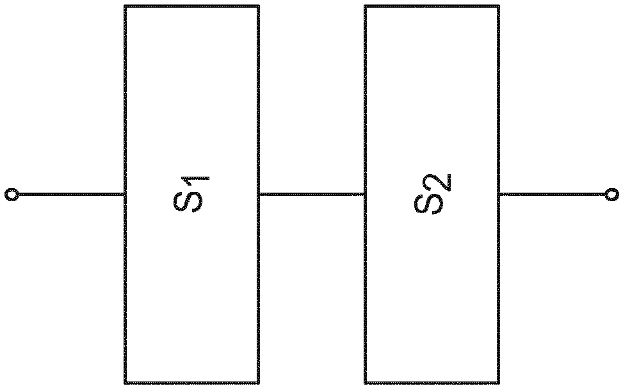
FIG. 7 shows a flow chart diagram of an embodiment of a method for the manufacturing of a heating element for an electronic smoking device.

In FIG. 7, a flow chart diagram of an embodiment of a method for the manufacturing of a heating element for an electronic smoking device is shown. In this embodiment, the method comprises two steps S1, S2. As a first step S1, the method comprises the step of providing a conductive material 28-1 with a first and a second terminal for the connection with a power source respectively. Expressed in other words, the conductive material provided in the first step S1 can be electrically connected to a power source. As a second step S2, the method comprises the step of treating a fraction of the surface of the conductive material 28-1 mechanically, providing the fraction of the surface with a plurality of structures 51 adapted to provide a capillary force on the liquid of the liquid reservoir 34 when applied onto the heating element 28. However, in other embodiments of the method, a fraction of the surface of the conductive material 28-1 is alternatively or additionally treated chemically within the second step S2. In further embodiments, a fraction of the surface of the conductive material 28-1 is alternatively or additionally treated using an external power source, e.g. a laser source.

In this embodiment of the method, the second step S2 of treating exemplarily comprises a grinding of the fraction of the surface 50 of the conductive material 28-1. However, in other embodiments, it can also comprise a sand-blasting, a polishing, a brushing, a milling, a scouring, a tumbling, a drifting, a shot-blasting and/or a peening or another kind of mechanical treatment. Furthermore, in other embodiments of the method where the method comprises the second step S2 of treating a fraction of the surface of the conductive material 28-1 chemically, the second step S2 of treating can further comprise an etching, a laser-etching, a pickling, a bating, a bronzing and/or another kind of mechanical treatment of the fraction of the surface 50 of the conductive material 28-1.

In this embodiment, the fraction of the surface exemplarily comprises the total surface of the heating element. However, in other embodiments, a fraction of the surface can also comprise 5%, 10%, 15%, 20%, 25%, 30%, 35%, 40%, 45%, 50%, 55%, 60%, 65%, 70%, 75%, 80%, 85%, 90% or 95% of the surface of the respective heating element.

Furthermore, it is presented an electronic smoking device which comprises a liquid reservoir, a battery and a heating element adapted to atomize liquid of the liquid reservoir.

The heating element has a modified surface which comprises a plurality of structures adapted to provide a capillary force on liquid of the liquid reservoir when applied onto the heating element.

An advantage of that may be that the transport of liquid provided onto the heating element from the liquid reservoir is significantly improved. A further advantage of that may be that such structures may increase the overall surface of the heating element which increases the amount of heat that can be generated via the heating element.

Preferably, the heating element is realized as a heating wire comprising a conductive material. An advantage of that may be that due to the small diameter of such heating wires, more heat can faster be generated via the heating element.

In a furthermore preferred embodiment, at least some of the structures of the modified surface of the heating element have been generated via a mechanical treatment of the heating element.

Such mechanical treatments are cost-efficient and allow a provision of large and rough structures but also of small and precise structures, depending on the specific mechanical treatment.

Preferably, the mechanical treatment comprised a grinding treatment and/or a sand-blasting treatment of the heating element. An advantage of that may be that via a grinding treatment, large structures resembling cavities or furrows can be realized within the surface of the heating element, wherein via a sand-blasting treatment, rather small and flat structures can be realized within the surface of the heating element.

Furthermore preferred, the mechanical treatment comprised polishing, brushing, milling, scouring, tumbling, drifting, shot-blasting, especially shot-blasting with steel balls and/or peening of the heating element. An advantage of that may be that via such mechanical treatments, different kinds of structures can be realized within the surface of the heating element.

Moreover preferred, at least some of the structures of the modified surface of the heating element have been generated via a chemical treatment of the heating element. An advantage of that may be that such a chemical treatment provides the surface of the heating element with a plurality of dense structures that are clear cut and allow for a large increase of the total surface of the heating element.

Preferably, the chemical treatment comprised an etching treatment of the heating element. An advantage of that may be that especially isotropic or anisotropic etching treatments provide the surface of the heating element with for example deep and clear-cut trenches of a shape that can precisely be adjusted.

In a preferred embodiment, the chemical treatment of the heating element comprised pickling, bating and/or bronzing of the heating element. An advantage of that may be that structures of different shapes and sizes can be generated on a surface of the heating element via such treatments. The used treatment can be chosen depending on the intended purpose of the heating element, for example depending on the desired heat generation behaviour of the heating element.

Preferably, at least some of the structures of the modified surface of the heating element have been generated via a laser-etching treatment of the heating element. An advantage of that may be that laser-etched structures are extremely precise and allow for complex modified surfaces.

In a preferred embodiment, the structures of the modified surface increase the total surface of the heating element. An advantage of that may be that more heat can be generated via a heating element that has an increased surface.

Preferably, the modified surface of the heating element has a maximum roughness $R_{max}$ that is greater than 0.5 mm. Furthermore preferred, the modified surface of the heating element has a maximum roughness $R_{max}$ that is greater than 0.1 mm, 0.2 mm, 0.3 mm, 0.4 mm, 0.6 mm, 07 mm, 0.8 mm, 0.9 mm or greater than 1 mm. Furthermore preferred, the modified surface of the heating element has a maximum roughness $R_{max}$ that is greater than 5 μm, greater than 10 μm, greater than 15 μm, greater than 20 μm, greater than 25 μm, greater than 30 μm, greater than 35 μm, greater than 40 μm, greater than 45 μm, greater than 50 μm, greater than 55 μm, greater than 60 μm, greater than 65 μm, greater than 70 μm, greater than 75 μm, greater than 80 μm, greater than 85 μm, greater than 90 μm, greater than 95 μm or greater than 100 μm. Preferably, the aforementioned maximum roughness $R_{max}$ is measured across the whole modified surface. Expressed in other words, preferably, the whole modified surface has a maximum roughness $R_{max}$ that is greater than 0.1 mm, 0.2 mm, 0.3 mm, 0.4 mm, 0.6 mm, 07 mm, 0.8 mm, 0.9 mm or greater than 1 mm. Furthermore preferred, the whole modified surface of the heating element has a maximum roughness $R_{max}$ that is greater than 5 μm, greater than 10 μm, greater than 15 μm, greater than 20 μm, greater than 25 μm, greater than 30 μm, greater than 35 μm, greater than 40 μm, greater than 45 μm, greater than 50 μm, greater than 55 μm, greater than 60 μm, greater than 65 μm, greater than 70 μm, greater than 75 μm, greater than 80 μm, greater than 85 μm, greater than 90 μm, greater than 95 μm or greater than 100 μm. Preferably, the maximum roughness $R_{max}$ indicates the largest roughness depth on the entire measuring length. Preferably, the measuring length extends across the whole modified surface of the heating element. Furthermore preferred, the maximum surface roughness $R_{max}$ is defined as the difference in height between the highest peak and the lowest valley of the modified surface of the heating element.

An advantage of that may be that such a modified surface on the one hand increases the total surface of the heating element to a large extend and allows capillary forces affecting the liquid transport to arise. On the other hand, such a heating element can nevertheless easily be manufactured and can further simply be handled/generated via existing treatment tools.

In a preferred embodiment, the modified surface of the heating element has an average surface roughness $R_z$ of Y, wherein Y∈[5 μm; 200 μm]. Furthermore preferred, the modified surface of the heating element has an average surface roughness $R_z$ of Y, wherein Y∈[10 μm; 200 μm], or Y∈[15 μm; 200 μm], or Y∈[20 μm; 200 μm], or Y∈[25 μm; 200 μm], or Y∈[30 μm; 200 μm] or Y e [35 μm; 200 μm], or wherein Y∈[0.5 mm; 2.5 mm]. Even more preferred, the modified surface of the heating element has an average surface roughness $R_z$ of Y, wherein Y∈[1 mm; 1.5 mm] or wherein Y∈[1 mm; 1.25 mm]. Furthermore preferred, the modified surface of the heating element has an average surface roughness $R_z$ of Y across the whole modified surface, wherein Y E [5 μm; 200 μm]. Furthermore preferred, the modified surface of the heating element has an average surface roughness $R_z$ of Y across the whole modified surface, wherein Y∈[10 μm; 200 μm], or Y∈[15 μm; 200 μm], or Y∈[20 μm; 200 μm], or Y∈[25 μm; 200 μm], or Y∈[30 μm; 200 μm] or Y∈[35 μm; 200 μm], or wherein Y∈[0.5 mm; 2.5 mm]. Even more preferred, the modified surface of the heating element has an average surface roughness $R_z$ of Y across the whole modified surface, wherein Y∈[1 mm; 1.5 mm] or wherein Y∈[1 mm; 1.25 mm].

An advantage of that may be that in such an embodiment, the heat generation and radiation characteristics are optimized.

Preferably, the modified surface has an arithmetical mean deviation $R_a$ that is greater than 5 µm. Even more preferred, the modified surface has an arithmetical mean deviation that is greater than 10 µm, greater than 15 µm, greater than 20 µm, greater than 25 µm, greater than 30 µm, greater than 35 µm or greater than 40 µm. Even more preferred, the modified surface has an arithmetical mean deviation that is greater than 45 µm, greater than 50 µm, greater than 55 µm, greater than 60 µm, greater than 65 µm, greater than 70 µm, greater than 75 µm, greater than 80 µm, greater than 85 µm, greater than 90 µm, greater than 95 µm or greater than 100 µm.

Expressed in other words, the arithmetical mean deviation of the profile of the heating element preferably is greater than 5 µm, greater than 10 µm, greater than 15 µm, greater than 20 µm, greater than 25 µm, greater than 30 µm or greater than 35 µm. Preferably, the aforementioned values are measured across the whole modified surface of the heating element. Expressed in other words, according to a preferred embodiment, the whole modified surface of the heating element has an arithmetical mean deviation $R_a$ that is greater than 5 µm, greater than 10 µm, greater than 15 µm, greater than 20 µm, greater than 25 µm, greater than 30 µm, greater than 35 µm, greater than 40 µm, greater than 45 µm, greater than 50 µm, greater than 55 µm, greater than 60 µm, greater than 65 µm, greater than 70 µm, greater than 75 µm, greater than 80 µm, greater than 85 µm, greater than 90 µm, greater than 95 µm, greater than 100 µm, greater than 130 µm, greater than 160 µm, greater than 190 µm, greater than 210 µm, greater than 230 µm, greater than 260 µm, greater than 280 µm or even greater than 350 µm. Furthermore preferred, the modified surface has an arithmetical mean deviation $R_a$ that is greater than 0.5 mm, greater than 1 mm, greater than 1.5 mm or even greater than 2 mm. Moreover preferred, the whole modified surface of the heating element has an arithmetical mean deviation $R_a$ that is greater than 0.5 mm, 1 mm, 1.5 mm or greater than 2 mm.

Preferably, the arithmetical mean deviation in relation to the surface texture or profile of the heating element is defined as the arithmetical average value of the departure of the profile or of the surface of the heating element above and below a reference line—which is also denoted as the centre line—throughout a predefined sampling length. Preferably, the predefined sampling length extends across the whole surface or profile of the heating element.

An advantage of that may be that with such a surface, the capillary forces which are due to the generated structures allow an optimal transport of liquid applied to the heating element.

Furthermore, a method for the manufacturing of a heating element for an electronic smoking device is presented, the method comprises the following steps: providing a conductive material with a first and a second terminal for the connection with a power source respectively. Treating at least a fraction of the surface of the conductive material mechanically and/or chemically and/or using an external power source, providing the fraction of the surface with a plurality of structures adapted to provide a capillary force on the liquid of the liquid reservoir when applied onto the heating element. An advantage of such a method may be that a resulting, manufactured heating element has structures on its surface which increase the total surface on the heating element and provide capillary forces affecting the liquid applied onto the heating element. Such structures may be tubes, fins, cracks, cavities, furrows, trenches or cubic, trapezoidal structures. Furthermore, also other structures with other shapes can be realized on the surface of a heating element.

Preferably, the step of treating comprises a grinding, a sand-blasting, a polishing, a brushing, a milling, a scouring, a tumbling, a drifting, a shot-blasting and/or a peening of the fraction of the surface of the conductive material. An advantage of that may be that structures on the surface of the heating element may easily be generated with such treatments, wherein the generatable structures differ from one another, depending on the respective treatment.

Moreover preferred, the step of treating comprises an etching, a laser-etching, a pickling, a bating and/or a bronzing of the fraction of the surface of the conductive material. An advantage of that may be that with such treatments, precise structures can be generated which allows for a precise control of the heat that can be generated with the respective heating element.

While this invention has been described in connection with what is presently considered to be practical exemplary embodiments, it is to be understood that the invention is not limited to the disclosed embodiments, but, on the contrary, is intended to cover various modifications and equivalent arrangements included within the scope of the appended claims.

LIST OF REFERENCE SIGNS

10, 110, 210, **310*a*-310*i*, 410*a*-410*i*, 510*a*, 510*b*** electronic smoking device
12 power supply portion
14 atomizer/liquid reservoir portion
16 end cap
18 battery
20 light-emitting diode (LED)
22 control electronics
24 airflow sensor
26 atomizer
28, 128, 228, **328*a*-328*i*, 428*a*-428*i*, 528*a*, 528*b*** heating element/heating coil
28-1, **128-1*a*** conductive material
30, 130, 230, 330 wick
32 central passage
34 liquid reservoir
36 air inhalation port
38 air inlets
50, 150, 250, **350*a*-350*i*, 450*a*-450*i*, 550*a*, 550*b*** modified surface
51, 151, 251, **351*a*-351*i*; 451*a*-451*i*, 551*a*, 551*b*** structures
52 hollow cylinder
53 ceramic substrate
54 non-conductive material
55 conductive material spots
56 carrier substrate
57 inner channel
58 corpus
59 non-conductive material spots
60 inner chambers
61 conductive solid cylinders
S1 step of providing
S2 step of treating

The invention claimed is:

1. An electronic smoking device comprising:
a liquid reservoir;
a battery;

a heating element adapted to atomize a liquid of the liquid reservoir, the heating element further adapted to be provided power by the battery;

wherein the heating element has a modified surface which comprises a plurality of structures adapted to provide a capillary force on the liquid of the liquid reservoir when applied onto the heating element, wherein the plurality of structures include a fin, crack, furrow, trench, cubic structure, or trapezoidal structure.

2. The electronic smoking device according to claim 1, wherein the heating element comprises a heating wire comprising a conductive material.

3. The electronic smoking device according to claim 1, wherein at least some of the structures of the modified surface of the heating element are generated via a mechanical treatment of the heating element.

4. The electronic smoking device according to claim 3, wherein the mechanical treatment comprises at least one of a grinding treatment and a sand-blasting treatment of the heating element.

5. The electronic smoking device according claim 3, wherein the mechanical treatment comprises at least one of polishing, brushing, milling, scouring, tumbling, drifting, shot-blasting, shot-blasting with steel balls and peening of the heating element.

6. The electronic smoking device according to claim 1, wherein at least some of the structures of the modified surface of the heating element are generated via a chemical treatment of the heating element.

7. The electronic smoking device according to claim 6, wherein the chemical treatment comprises an etching treatment of the heating element.

8. The electronic smoking device according to claim 6, wherein the chemical treatment of the heating element comprises at least one of pickling, bating and bronzing of the heating element.

9. The electronic smoking device according to claim 1, wherein at least some of the structures of the modified surface of the heating element are generated via a laser-etching treatment of the heating element.

10. The electronic smoking device according to claim 1, wherein the structures of the modified surface are configured to increase the total surface of the heating element.

11. The electronic smoking device according to claim 1, wherein the modified surface of the heating element has a maximum roughness $R_{max}$ that is greater than 0.5 mm.

12. The electronic smoking device according to claim 1, wherein the modified surface of the heating element has an average surface roughness $R_z$ of Y, wherein $Y \in [5\ \mu m; 200\ \mu m]$.

13. The electronic smoking device according to claim 1, wherein the modified surface has an arithmetical mean deviation $R_a$ that is greater than 5 μm.

14. A method for the manufacturing of a heating element for an electronic smoking device, the method comprising the steps of:

providing a conductive material with a first terminal and a second terminal, respectively, for connection with a power source;

treating at least a fraction of a surface of the conductive material mechanically or chemically or using an external power source; and providing the fraction of the surface with a plurality of structures adapted to provide a capillary force on liquid of a liquid reservoir when applied onto the heating element, wherein the plurality of structures include a fin, crack, furrow, trench, cubic structure, or trapezoidal structure.

15. The method of claim 14, wherein the step of treating comprises at least one of a grinding, a sand-blasting, a polishing, a brushing, a milling, a scouring, a tumbling, a drifting, a shot-blasting and a peening of the fraction of the surface of the conductive material.

16. The method of claim 14, wherein the step of treating comprises at least one of an etching, a laser-etching, a pickling, a bating and a bronzing of the fraction of the surface of the conductive material.

17. A method for the manufacturing of a heating element for an electronic smoking device, the method comprising the steps of:

providing a conductive material with a first terminal and a second terminal, respectively, for the connection with a power source; and treating at least a fraction of a surface of the conductive material mechanically or chemically or using an external power source to provide a modified surface of the heating element, wherein the modified surface of the heating element includes a fin, crack, furrow, trench, cubic structure, or trapezoidal structure.

18. The method of claim 17, wherein the modified surface comprises a plurality of structures adapted to provide a capillary force on liquid of a liquid reservoir when applied onto the heating element.

19. The method of claim 17, wherein the step of treating comprises at least one of a grinding, a sand-blasting, a polishing, a brushing, a milling, a scouring, a tumbling, a drifting, a shot-blasting and a peening of the fraction of the surface of the conductive material.

20. The method of claim 17, wherein the step of treating comprises at least one of an etching, a laser-etching, a pickling, a bating and a bronzing of the fraction of the surface of the conductive material.

* * * * *